(12) United States Patent
Cerceau et al.

(10) Patent No.: US 10,276,881 B2
(45) Date of Patent: Apr. 30, 2019

(54) STACK OF CELLS OF A FUEL CELL AND FUEL CELL COMPRISING SUCH A STACK

(71) Applicant: L'Air Liquide, Societe Anonyme pour l'Etude et l'Exploitation des Procedes Georges Claude, Paris (FR)

(72) Inventors: Arnaud Cerceau, Charavines (FR); Marion Paris, Grenoble (FR); Eric Patras, Grenoble (FR); Elisabeth Rossinot, Meaudre (FR); Helene Trouve, Sassenage (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 0 days.

(21) Appl. No.: 15/536,011

(22) PCT Filed: Oct. 2, 2015

(86) PCT No.: PCT/FR2015/052640

§ 371 (c)(1),
(2) Date: Jun. 14, 2017

(87) PCT Pub. No.: WO2016/097504

PCT Pub. Date: Jun. 23, 2016

(65) Prior Publication Data

US 2018/0019484 A1 Jan. 18, 2018

(30) Foreign Application Priority Data

Dec. 16, 2014 (FR) ...................................... 14 62517

(51) Int. Cl.
*H01M 8/00* (2016.01)
*H01M 8/04082* (2016.01)
(Continued)

(52) U.S. Cl.
CPC ..... *H01M 8/04201* (2013.01); *H01M 4/8875* (2013.01); *H01M 8/006* (2013.01);
(Continued)

(58) Field of Classification Search
CPC .. H01M 8/2485; H01M 8/006; H01M 8/0258; H01M 8/0267
See application file for complete search history.

(56) References Cited

U.S. PATENT DOCUMENTS

2002/0058177 A1 5/2002 Nishiyama et al.
2006/0110649 A1 5/2006 Nishiyama et al.
(Continued)

FOREIGN PATENT DOCUMENTS

EP 0 975 039 1/2000
FR 2 997 560 5/2014

OTHER PUBLICATIONS

International Search Report and Written Opinion for PCT/FR2015/052640, dated Nov. 20, 2015.
(Continued)

*Primary Examiner* — Cynthia H Kelly
*Assistant Examiner* — Monique M Wills
(74) *Attorney, Agent, or Firm* — Christopher J. Cronin

(57) ABSTRACT

The invention relates to a stack of cells of a fuel cell comprising an anode plate and a cathode plate, at a first one of the two ends thereof, the stack ending in a first anode or cathode end plate, respectively, arranged on the cathode or anode plate, respectively, of the last cell of the stack, said first end plate defining a circuit for the cooling fluid of the last cell and said first end plate being an anode or cathode plate, respectively, identical to the anode and cathode plates, respectively, of the cells but missing the opening for dispensing reagent. It is thus possible to simplify the development and the assembly of a stack of cells of a fuel cell with
(Continued)

proton-exchange membrane while ensuring a good seal and satisfactory cooling at the end of the stack.

11 Claims, 3 Drawing Sheets

(51) Int. Cl.
    *H01M 8/241* (2016.01)
    *H01M 8/2485* (2016.01)
    *H01M 8/0258* (2016.01)
    *H01M 8/0267* (2016.01)
    *H01M 4/88* (2006.01)
    *H01M 8/0276* (2016.01)
    *H01M 8/04007* (2016.01)
    *H01M 8/04089* (2016.01)
    *H01M 8/1004* (2016.01)
    *H01M 8/1018* (2016.01)

(52) U.S. Cl.
    CPC ....... *H01M 8/0258* (2013.01); *H01M 8/0267* (2013.01); *H01M 8/0276* (2013.01); *H01M 8/04074* (2013.01); *H01M 8/04089* (2013.01); *H01M 8/1004* (2013.01); *H01M 8/241* (2013.01); *H01M 8/2485* (2013.01); *H01M 2008/1095* (2013.01)

(56) References Cited

U.S. PATENT DOCUMENTS

| | | | |
|---|---|---|---|
| 2010/0068599 A1 | 3/2010 | Furusawa et al. | |
| 2014/0023954 A1* | 1/2014 | Oku | H01M 8/2483 429/482 |
| 2014/0141352 A1* | 5/2014 | Suzuki | H01M 8/0265 429/465 |

OTHER PUBLICATIONS

French Search Report and Written Opinion for FR 1 462 517, dated May 18, 2015.

* cited by examiner

STACK OF CELLS OF A FUEL CELL AND FUEL CELL COMPRISING SUCH A STACK

CROSS-REFERENCE TO RELATED APPLICATIONS

This application is a § 371 of International PCT Application, PCT/FR/2015/052640 filed Oct. 2, 2015, which claims § 119(a) foreign priority to French patent application FR 1 462 517, filed Dec. 16, 2014.

BACKGROUND

Field of the Invention

The present invention concerns a stack of cells of a fuel cell and a fuel cell comprising such a stack.

More particularly, the invention concerns a stack of cells of a fuel cell with a proton exchange membrane in which the cells each comprise an anode plate and a cathode plate, holding in sandwich fashion a Membrane Electrode Assembly, each plate having two opposite faces, respectively a reactive face and a cooling face, the reactive face of each plate being intended to face the Membrane Electrode Assembly and being provided with relief points and hollows forming at least one channel for the circulation of a reagent, the cooling face defining a path for a cooling fluid of the cell, the at least one channel for circulation of a reagent having an inlet communicating with an orifice for distribution of reagent, formed through the plate, the plate furthermore comprising a reagent inlet collector orifice which is distinct from the reagent distribution orifice, the reagent inlet collector orifice being provided to supply reagent to the inlet of the channel via a passage located on the cooling face and producing a fluidic connection between the inlet collector orifice and the reagent distribution orifice, each plate having a peripheral seal disposed on the reactive face and comprising a portion forming a loop around the inlet collector orifice.

Related Art

The cells of a fuel cell (anode side and cathode side) generate heat (the chemical reactions within the cell are exothermic) and need to be cooled by a cooling circuit.

In the case of a cell composed of two plates holding a Membrane Electrode Assembly in sandwich fashion, each plate (anode or cathode) comprises a side devoted to the circulation of the reactive gases (air or hydrogen facing the Membrane Electrode Assembly) and a side (turned toward the outside of the cell) devoted to the circulation of the cooling fluid (liquid).

Thus, at each end of a stack it is necessary to close the circuit of the cooling fluid. In fact, since a stack of cells terminates in one half of the cooling circuit, it is thus necessary to find a means of closing this cooling half-circuit for these last half-cells.

In particular, the passage of cooling liquid via internal collectors requires a proper sealing of the interface between the last half-cell and the end of the fuel cell, while ensuring an effective cooling of the last active half-cell of the stack.

SUMMARY OF THE INVENTION

One purpose of the present invention is to solve this problem in a simple and economical manner by mitigating some or all of the drawbacks of the prior art.

To this end, the stack of cells of a fuel cell according to the invention, and furthermore according to the generic definition given in its preamble above, is basically characterized in that, at a first of its two ends, the stack is terminated by a first anode or respectively cathode end plate, disposed on the cathode or respectively anode end plate of the last cell of the stack, said first end plate delimiting a circuit for the cooling fluid of the last cell, this first end plate being an anode or respectively cathode plate similar to the anode or respectively cathode plates of the cells, but lacking a reagent distribution orifice.

Furthermore, embodiments of the invention may comprise one or more of the following characteristics:
- at its second end, the stack is terminated by a second cathode or respectively anode end plate, disposed on the cathode or respectively anode plate of the last cell of the stack, said second end plate delimiting a circuit for the cooling fluid of the end cell of the stack, and in that this second end plate is a cathode or respectively anode plate similar to the cathode or respectively anode plates of the cells, but lacking a distribution orifice,
- the second end plate is a plate identical to the cathode or respectively anode plates of the cells, except that it does not have a distribution orifice,
- the first end plate is a plate identical to the anode or respectively cathode plates of the cells, except that it does not have a distribution orifice,
- the plates of the cells are fabricated by molding and/or machining and/or hydroforming and/or stamping and/or by three-dimensional printing,
- the plates of the cells are molded and in that the first end plate is a plate identical to the anode or respectively cathode plates of the cells, and it is obtained by molding and making a plug in the area of the distribution orifice during the molding,
- the plates of the cells are molded and in that the second end plate is a plate identical to the anode or respectively cathode plates of the cells, and it is obtained by molding and making a plug in the area of the distribution orifice during the molding,
- at least one channel for circulation of each plate comprises an outlet with a reagent evacuation orifice formed through the plate, the plate furthermore comprising a reagent outlet collector orifice which is distinct from the evacuation orifice, the outlet collector orifice being provided to recuperate the reagent at the outlet from the at least one channel via a passage producing a fluidic connection between the outlet collector orifice and the evacuation orifice,
- the plates located at the ends of the stack are lacking in an evacuation orifice,
- the first end plate has a cooling face defining a path for a cooling fluid,
- the second end plate has a cooling face defining a path for a cooling fluid.

The invention also concerns a fuel cell comprising such a stack, in which the first end plate is a current collector plate.

According to other possible features:
- the second end plate is a current collector plate,
- in the position of use, the plates of the stack are disposed in parallel vertical planes.

The invention may likewise concern any alternative device or method comprising any combination of characteristics above or below.

BRIEF DESCRIPTION OF THE FIGURES

Other features and advantages will appear upon perusal of the following description, given with reference to the figures in which.

DETAILED DESCRIPTION OF THE INVENTION

Figure 4:
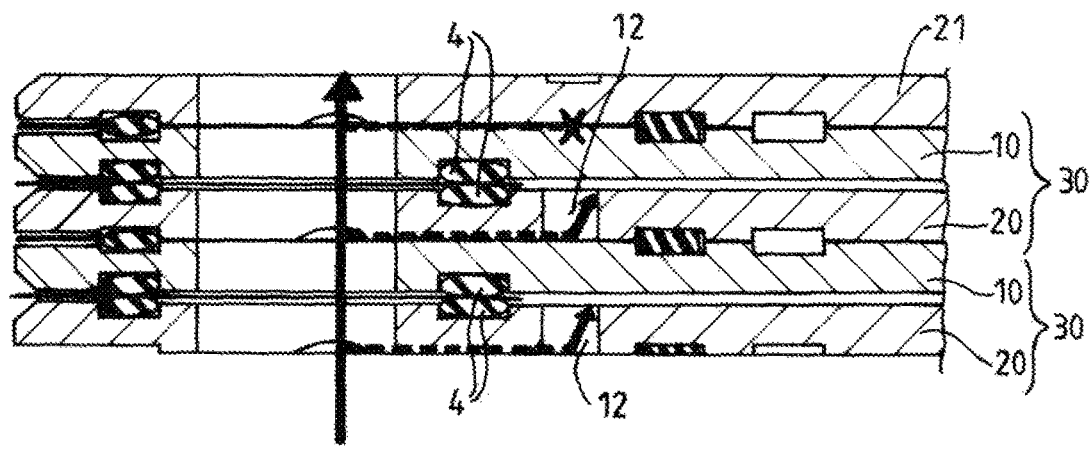
FIG. 4 shows a schematic and partial sectional view illustrating a sample embodiment of one end of a stack of cells of a fuel cell according to the invention.

As illustrated in FIG. 4, the plates 10, 20 of the fuel cell making up the stacked cells 30 have two opposite faces, respectively a reactive face and a cooling face.

Figure 1:
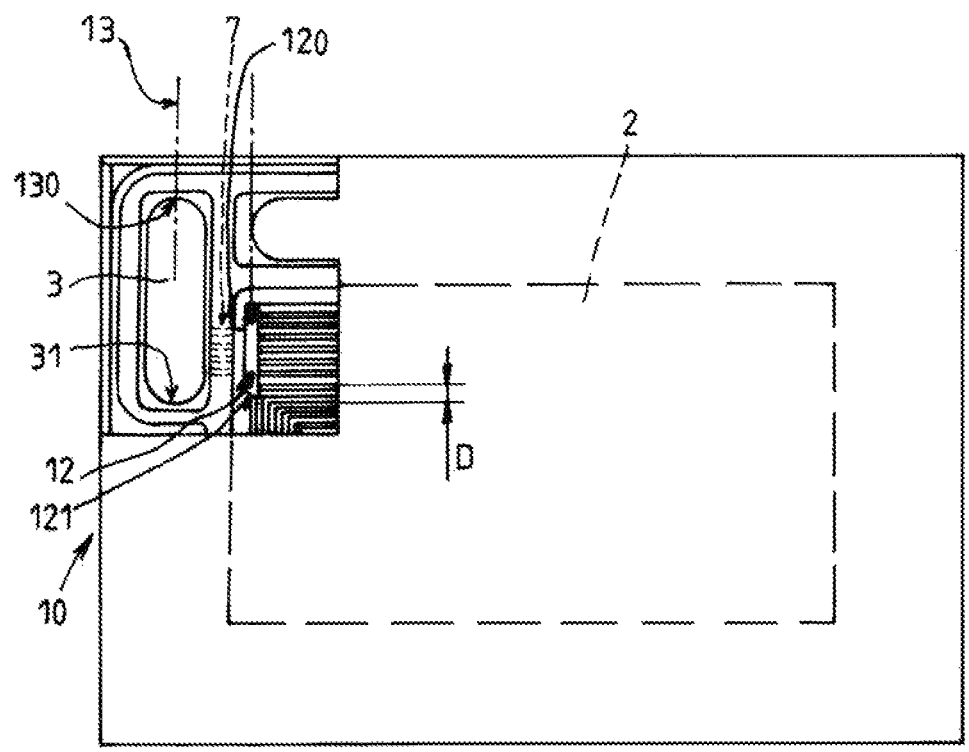
FIG. 1 shows in schematic and partial front view the reactive face of a plate of a fuel cell illustrating a first detail of one possible sample embodiment of the invention.

FIG. 1 shows schematically and partially the reactive face of a cathode plate 10 having relief points and hollows forming at least one channel 2 for circulation of a reagent.

The channel 2 for circulation of a reagent has an inlet communicating with a reagent distribution orifice 12 formed through the plate 1. The plate 1 furthermore comprises a reagent inlet collector orifice 3 which is distinct from the reagent distribution orifice 12. The reagent inlet collector orifice 3 is provided to supply reagent to the inlet of the at least one channel 2 via a passage 7 formed on the cooling face of the plate 1 and producing a fluidic connection between the inlet collector orifice 3 and the reagent distribution orifice 12 (also see FIGS. 4 and 5).

This passage 7 is diagrammed by dots and can be formed by one or more hollows or channels formed in the thickness of the plate 10 in the area of the separation between the two orifices 3, 12.

That is, the reactive gas arrives by the collector orifice 3 then transits via the passage along the cooling face of the plate up to the distribution orifice 12. The gas then passes through the thickness of the plate 10 via the distribution orifice 12 to reach the circulation channel 2 on the reactive face.

The inlet collector orifice 3 may extend lengthwise in the plane of the plate 1 along a first longitudinal direction 13 between a first lower end 31 and a second upper end 130. The distribution orifice 12 may extend lengthwise in the plane of the plate 10 along a second longitudinal direction 13 between a first lower end 121 and a second upper end 120. The first 13 and second 22 longitudinal directions are for example parallel to each other and vertical when the plate 10 is in the vertical position of use (see FIG. 3).

Figure 2:
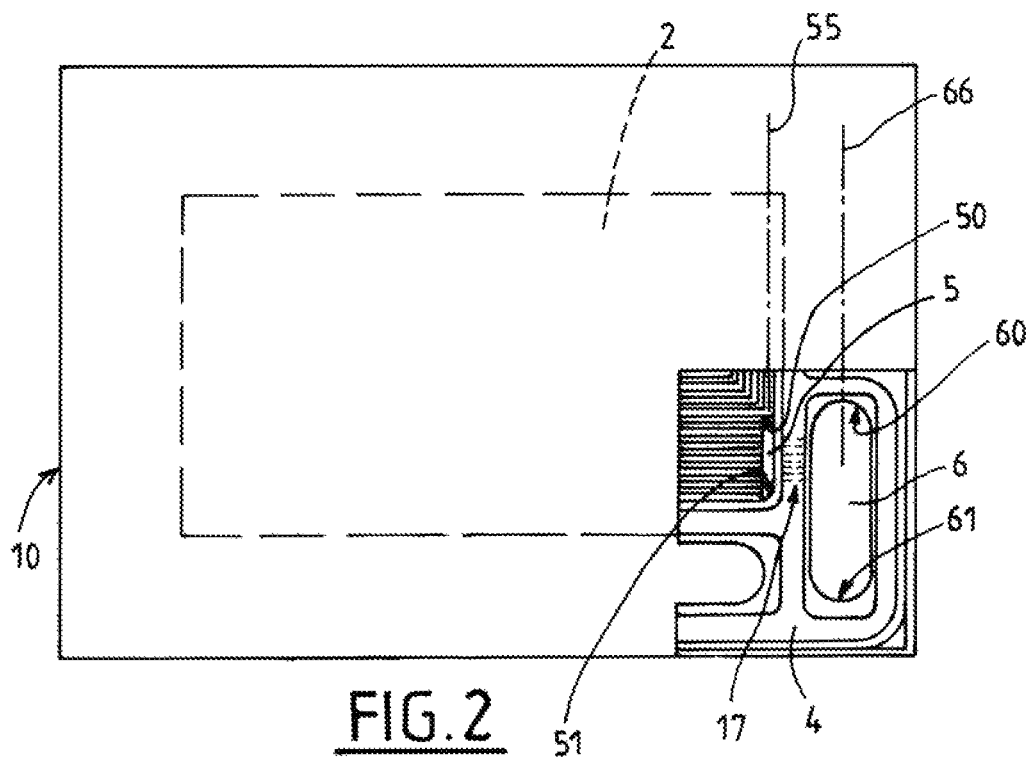
FIG. 2 shows in schematic and partial front view the reactive face of a plate of a fuel cell illustrating a second detail of one possible sample embodiment of the invention.

FIG. 2 illustrates the possible arrangement of the outlet collector 6 with respect to the evacuation orifice which receives the reactive gas at the outlet from the channel 2.

The arrangement of the outlet collector 6 with respect to the evacuation orifice 5 is for example symmetrically identical to the preceding one with respect to the center of the plate 1 (the lower end 61 of the collector orifice 6 may in particular be situated below the lower end of the evacuation orifice 5). Likewise, the outlet collector 6 and the evacuation orifice 5 may have oblong shapes extending in respective parallel directions 66, 55.

That is, the arrangements of the evacuation orifices 5 and of the outlet collector 6 may be symmetrically identical to the arrangements respectively of the distribution orifice 12 and the inlet collector 3. That is, the collectors 3, 6 may be identical and disposed symmetrically in relation to the center of the plate 1. Likewise, the orifices 12, 5 may be identical and disposed symmetrically in relation to the center of the plate 1. Thus, the plate may be symmetrical in the area of its inlets and outlets. That is, the plate does not have top and bottom sides and it can be mounted without the need for a poka-yoke to arrange the inlet on top and the outlet at the bottom or vice versa. This facilitates the assembly of the fuel cell.

The evacuation orifice 5 is, for example, usually positioned above the outlet collector 6. This likewise prevents an accumulation of water in the gas channels and prevents "water backup" from the outlet collector 6 to the evacuation orifice 5.

These structures thus enable better water management in the area of the fluid inlet and outlets (collectors 3, 6, orifices 12, 5), especially at low temperature.

This allows for better performance and service life of the corresponding cell, stack of cells, and fuel cell.

Conventionally, the reactive face of the plate comprises a peripheral seal 4 delimiting the various inlets and outlets and in particular the seal delimits (surrounds) the circulation channel 2. The seal 4 comprises a portion forming a loop around the inlet collector orifice 3 (same for the outlet collector 6). The seal 4 is intended to rest against the Membrane Electrode Assembly to separate the different fluid circuits.

Figure 3:
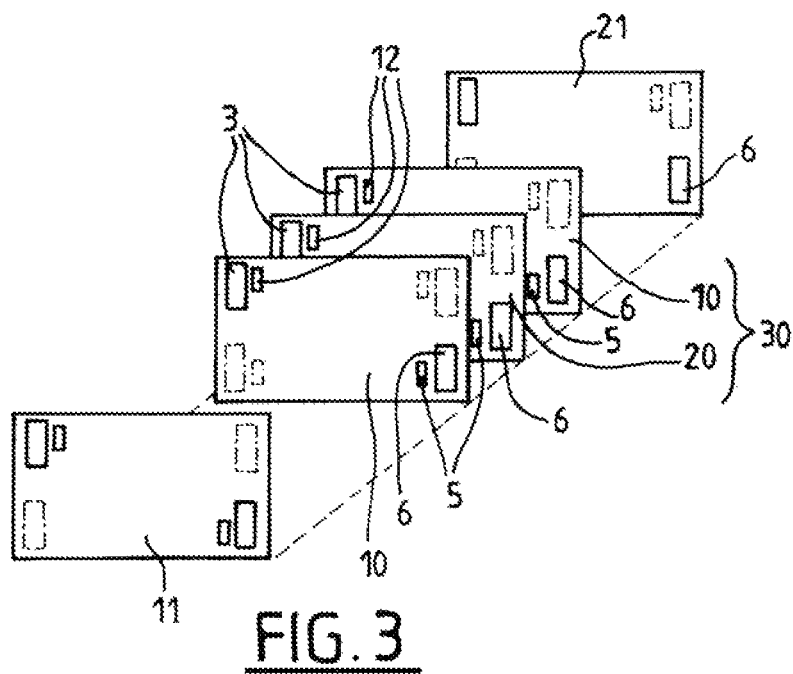
FIG. 3 shows a schematic and partial perspective view illustrating an example of a stack of plates of cells of a fuel cell.
Figure 5:
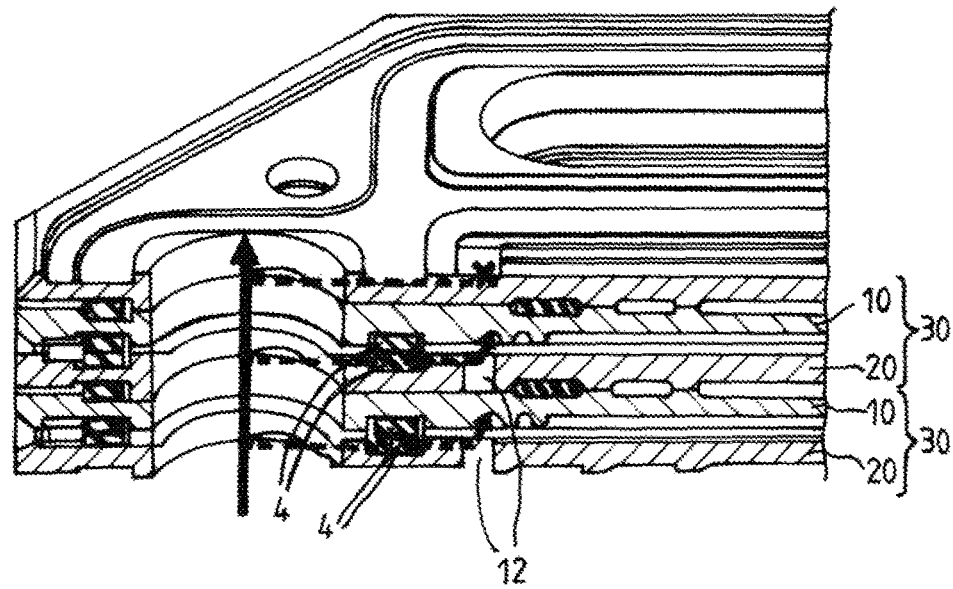
FIG. 5 shows a schematic and partial perspective and sectional view illustrating the end of the stack of FIG. 4.

According to one advantageous feature, at a first of its two ends (the end in the direction of the stack of plates), the stack is terminated by a first anode (or respectively cathode) end plate 21, disposed on the cathode (or respectively anode) end plate 10 of the last cell 30 of the stack (see FIGS. 3 to 5).

For example, and as illustrated in FIGS. 3 to 5, the last cell 30 at the top of the stack is terminated by a cathode plate 10 and a first anode upper end plate 21 is disposed on this latter to close the cooling circuit.

Conversely, at the other end of the stack, the last plate 21 of the last cell 30 is an anode plate covered by a second cathode end plate 11.

The end plates 11, 21 delimit (close) the circuits for the cooling fluid at the ends of the stack.

According to one advantageous characteristic, these end plates 11, 21 are similar respectively to the anode or respectively cathode plates 10, 20 but they are lacking in a gas distribution orifice.

The first 21 and second 11 end plates thus only allow the passage of the cooling fluid without letting the reactive gases pass through their thickness.

This makes it possible to prevent the risks of reactive fluid leaks (hydrogen or air, for example, when these latter are the reagents used by the fuel cell), as well as an overconsumption of gases. The use of these end plates 11, 21 plugged in the area of the distribution orifice of reactive gases makes it possible to close the last half-cell as regards the cooling circuit. This furthermore ensures a good tightness between this last half-cell and the adjacent end element of the fuel cell.

After these end plates 11, 21, the fuel cell may conventionally have other elements such as at least one of: a current collector plate, a thermal insulating system of the stack, a stack clamping system, etc.

Preferably, the end plate 11, 21 (anode or cathode) is a plate identical to the anode or respectively cathode plates of the cells, except that it does not have a distribution orifice.

The elimination of this orifice 12 or 5 can be achieved during the molding of the plate (plastic and/or composite) by adding or modifying or removing for example an insert during the molding or by eliminating the step of piercing of the distribution orifice in order to achieve a plate which is plugged in this location.

In the event that the plate is made by machining, it will be enough to program the machine tool so as not to make this orifice in the particular plate. In the event that the plate is made by stamping or hydroforming, the fabrication process will be designed so as not to generate this orifice in the particular plate. The plate can also be fabricated by a method known as three-dimensional printing ("3D printing").

This makes it possible to reduce the fabrication cost of the end plates (minor modification of the standard plates for the cells).

This solution presents many advantages. Thus, it is not necessary to develop a particular piece at the end of the stacks of cells. For molding, for example, it will be enough to position an insert, or not, in the mold used to fabricate the other plates of the cells. For the other modes of fabrication mentioned, only a slight adaptation is needed as compared to the plates with orifice(s).

The end plates make it possible to simply close the last half-cell of the stack (cooling circuit) while ensuring a good tightness between this last half-cell and the end element of the fuel cell.

This structure also makes it possible to avoid the risks of leakage of reagents. The chemical risks can be avoided by the dimension and the integration of this or these end plates in relation to the end elements of the stack (chemical isolation of the different reagents).

Moreover, the plugged end plates may, if necessary, serve as current collector plates and thus reduce the bulk of the stack and the number of elements of which it is comprised.

The time to assemble the stack is also reduced.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A stack of cells of a fuel cell with a proton exchange membrane in which each of the cells comprises an anode plate and a cathode plate, sandwiching a Membrane Electrode Assembly, each plate having two opposite faces, respectively a reactive face and a cooling face, the reactive face of each plate being intended to face the Membrane Electrode Assembly and being provided with relief points and hollows forming at least one channel for the circulation of a reagent, the cooling face defining a path for a cooling fluid of the cell, the at least one channel for circulation of a reagent having an inlet communicating with an orifice for distribution of reagent, formed through the plate, the plate furthermore comprising a reagent inlet collector orifice which is distinct from the reagent distribution orifice, the reagent inlet collector orifice being provided to supply reagent to the inlet of the channel via a passage located on the cooling face and producing a fluidic connection between the inlet collector orifice and the reagent distribution orifice, each plate having a peripheral seal disposed on the reactive face and comprising a portion forming a loop around the inlet collector orifice, characterized in that, at a first of its two ends, the stack is terminated by a first anode or respectively cathode end plate, disposed on the cathode or respectively anode end plate, of the last cell of the stack, said first end plate delimiting a circuit for the cooling fluid of the last cell, and in that this first end plate is a plate identical to the anode or respectively cathode plates of the cells, except that it does not have a distribution orifice.

2. The stack of claim 1, wherein at its second end, the stack is terminated by a second cathode or respectively anode end plate, disposed on the cathode or respectively anode plate of the last cell of the stack, said second end plate delimiting a circuit for the cooling fluid of the end cell of the stack, and in that this second end plate is a cathode or respectively anode plate similar to the cathode or respectively anode plates of the cells, but lacking a distribution orifice.

3. The stack of claim 2, wherein the second end plate is a plate identical to the cathode or respectively anode plates of the cells, except that it does not have a distribution orifice.

4. The stack of claim 1, wherein the plates of the cells are fabricated by molding and/or machining and/or hydroforming and/or stamping and/or by three-dimensional printing.

5. The stack of claim 4, wherein the plates of the cells are molded and in that the first end plate is a plate identical to the anode or respectively cathode plates of the cells, and it is obtained by molding and making a plug in the area of the distribution orifice during the molding.

6. The stack of claim 1, wherein:
the plates of the cells are fabricated by molding and/or machining and/or hydroforming and/or stamping and/or by three-dimensional printing;
the plates of the cells are molded; and
the second end plate is a plate identical to the anode or respectively cathode plates of the cells except that a plug is made in the second end plate in the area of the distribution orifice during the molding thereof.

7. The stack of claim 1, wherein at least one channel for circulation of each plate comprises an outlet with a reagent evacuation orifice formed through the plate, the plate furthermore comprising a reagent outlet collector orifice which is distinct from the evacuation orifice, the outlet collector orifice being provided to recuperate the reagent at the outlet from the at least one channel via a passage producing a fluidic connection between the outlet collector orifice and the evacuation orifice.

8. The stack of claim 7, wherein the plates located at the ends of the stack are lacking in an evacuation orifice.

9. A fuel cell comprising a stack of cells of claim 1, wherein the first end plate is a current collector plate.

10. The fuel cell of claim 9, wherein the second end plate is a current collector plate.

11. The fuel cell of claim 1, wherein, the plates of the stack are disposed in parallel vertical planes.

* * * * *